Dec. 30, 1947.  G. W. ROESSLER ET AL  2,433,399
PROCESS OF MAKING HOLLOW, SEALED, GLASS BODIES
Filed March 15, 1943  2 Sheets-Sheet 1
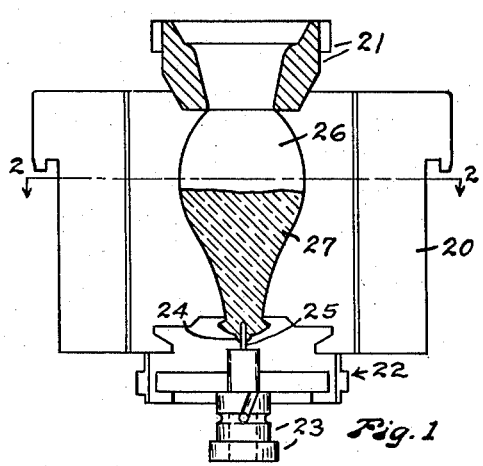
Fig. 1
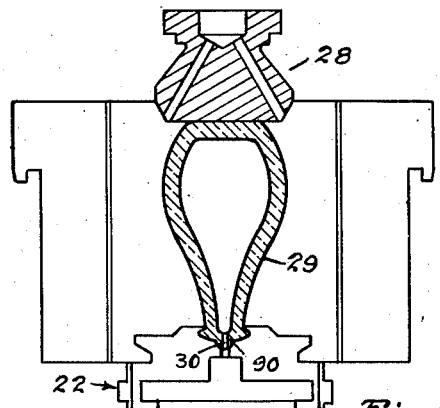
Fig. 3
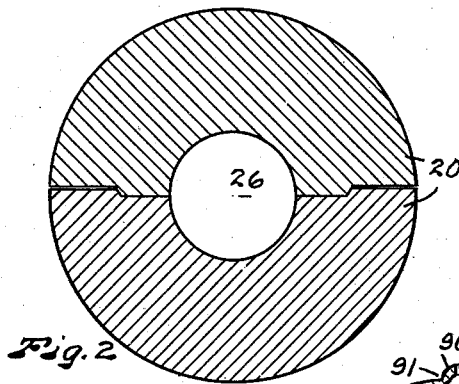
Fig. 2
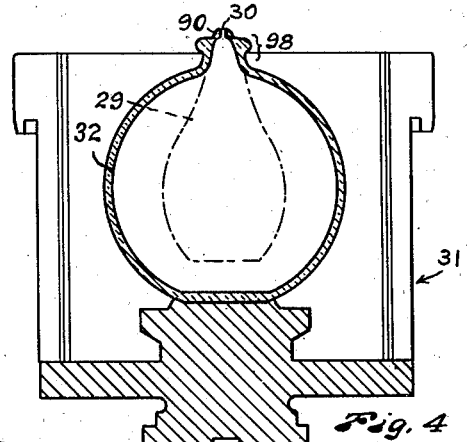
Fig. 4
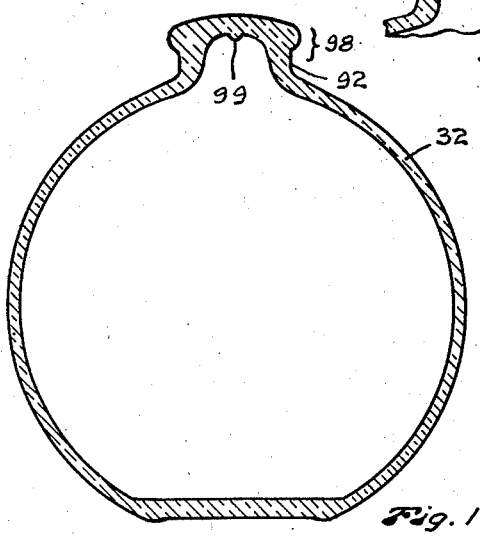
Fig. 12
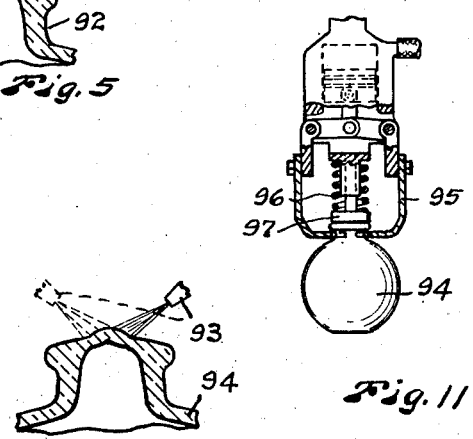
Fig. 5
Fig. 10
Fig. 11
INVENTOR.
GORDON W. ROESSLER
RAY A. CHILCOTE
BY Arnold and Mathis
ATTORNEYS Dec. 30, 1947.     G. W. ROESSLER ET AL     2,433,399
PROCESS OF MAKING HOLLOW, SEALED, GLASS BODIES
Filed March 15, 1943     2 Sheets-Sheet 2

INVENTOR
GORDON W. ROESSLER
RAY A. CHILCOTE
BY
Arnold and Mathis
ATTORNEYS

Patented Dec. 30, 1947

2,433,399

UNITED STATES PATENT OFFICE 2,433,399

PROCESS OF MAKING HOLLOW SEALED GLASS BODIES

Gordon W. Roessler and Ray A. Chilcote, Seattle, Wash., assignors to Northwestern Glass Company, Seattle, Wash., a corporation of Washington Application March 15, 1943, Serial No. 479,168

6 Claims. (Cl. 49—79)

Our invention relates to the process of providing a hollow sealed body.

More particularly our invention relates to the process of providing a hollow sealed body preferably spherical in form characterized in having a seal for the blow opening capable of resisting the pressures of extremely great magnitude obtaining at great depths which are encountered in deep sea gill net fishing.

For purposes of clearness and definiteness of disclosure, this invention has been set forth as applied to a fishing float but it is to be understood that the same extends to all uses where like conditions exist in whole or part. It may be applied to making sealed bodies of predetermined shape to be used for fishing where so called surface floating nets are employed or for such a purpose as building blocks for which use said bodies are particularly adapted since they would provide excellent insulating properties. Instead of glass, obviously any plastic material may be used presenting similar problems.

These nets are maintained in a substantially vertical position having weights secured to their lower edge portions and floats secured to their upper portions. As such floats, hollow glass bodies, preferably of spherical form, are particularly well adapted as they maintain indefinitely their buoyancy since they are water non-absorbent and are capable of producing such degree of buoyancy as is required to maintain the net in erect position with desired tautness. However, providing the blow opening with a sealing of sufficient strength to sustain the immense pressures found at great depths in the sea proved a problem of great difficulty. Our seal has been tested as deep as seven hundred and fifty feet in the sea and withstood the pressures successfully. How much deeper the same could operate has not been determined. Uniformity of body wall and construction is important in providing such performances. One feature of providing these seals relates to the necessity of forming them with great speed.

In order to make these floats in great quantities, speedily, economically and uniform in operation, they are made automatically by machines. In doing this, in turn, it was not practical to use in a machine a separate quantity of glass as a patch over the blow opening for forming the seal. It was important to discover a process whereby the seal and float could be formed from a single gob of molten glass. The globular or spherical form necessitated to resist the immense pressures obtaining in the depths of the sea and the thinness of wall construction important to provide maximum buoyancy to the float involved developing a substantial vacuum upon cooling. This vacuum interfered, if it did not prohibit, making the seal at the time of forming the molten glass into the spherical body.

A primary object of our invention is to overcome the difficulties set forth above together with others and to provide from a single mass or gob of molten glass a hollow glass fishing float preferably of spherical form characterized by employing (a) a portion of the original mass or gob of molten glass, separated to form the float, in making the seal for the blow opening and forming the seal within the blow opening, (b) the vacuum formed upon the cooling of the air within the globular body of the float to assist in drawing in the sealing portion of molten glass, and (c) the annular wall of the finish adjacent the blow opening as a buttress against which the sealing molten glass can be mechanically pressed to positively insure a tight seal and to cooperate with the pressure applied in controlling the thickness of wall of the seal, making same if desired substantially equal to or greater than that of the body of the float.

The above mentioned general objects of our invention, together with others inherent in the same, are attained by the mechanism illustrated in the following drawings, the same being preferred exemplary forms of embodiment of our invention, throughout which drawings like reference numerals indicate like parts:

Figure 1 is a view in vertical section of the parison blank mold with a gob of molten glass with funnel in position at top to guide the molten glass, plunger of finish ring projecting into the parison blank mold cavity and the finish ring with the basin-like cavity to form a dome-like protuberance around the blow opening;

Fig. 2 is a section view of Figure 1 on dotted line 2—2 showing the two halves of the parison blank mold;

Fig. 3 is a view in vertical section of the parison blank mold with the baffle in position above the formed parison, which is ready to be withdrawn, inverted and deposited in the blow mold;

Fig. 4 is a view in vertical section of the blow mold with the parison in dotted line shown blown into spherical form to form the float;

Fig. 5 is a view in vertical section of the finish or neck of the float with the blow opening formed in the dome-like protuberance of our invention;

Fig. 10 is a view in vertical section of the finish showing the melting of the dome-like protuberance by a mannually controlled oxy-acetylene burner;

Fig. 11 is a somewhat diagrammatic view in elevation partly sectional showing a spherical float being held by transfer tongs equipped with a plunger to compress the seal; and Fig. 12 is a view in vertical section of a completed seal and float.

Figure 7:
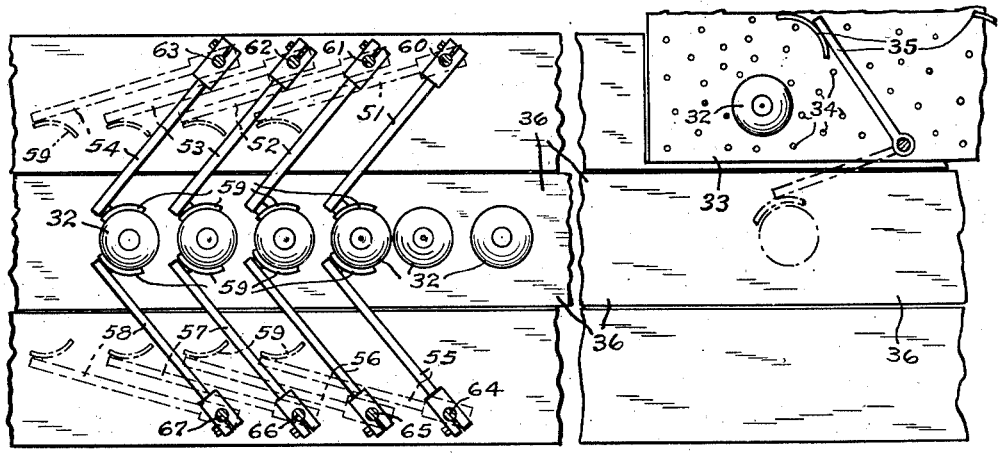
Fig. 7 is plan view of positioning arms whereby the floats are accurately positioned in registration with the oxy-acetylene flame and pneumatic plunger for seal pressing looking down on line 7—7 of Fig. 6.
Figure 6:
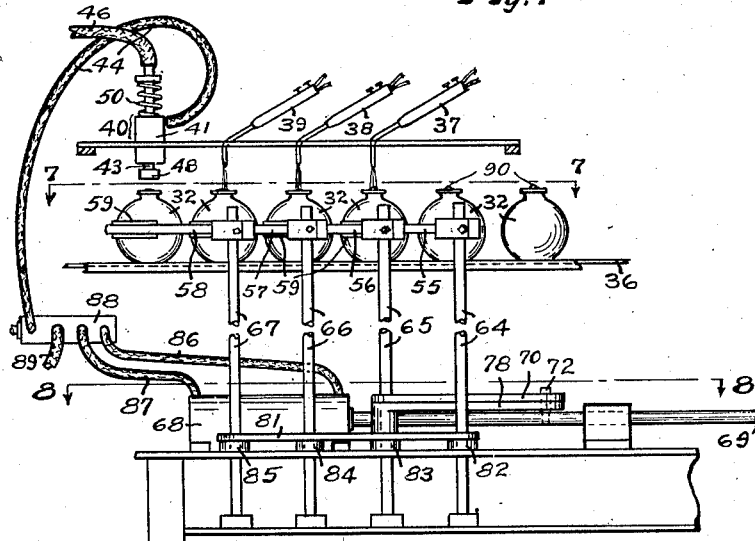
Fig. 6 is a view in elevation of the conveying belt, positioning arms with operating shafts, timing means therefor, oxy-acetylene burners for reheating the finish and pneumatic plunger for seal pressing.
Figure 9:
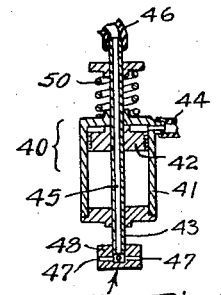
Fig. 9 is a view in vertical section of the sealing plunger means.
Figure 8:
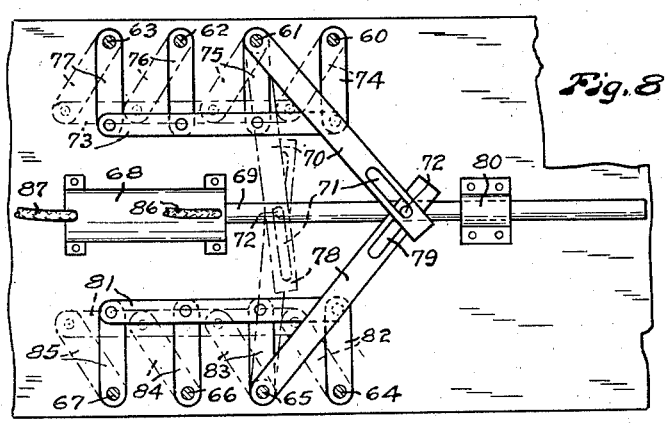
Fig. 8 is a plan view of link means, piston and means for actuating positioning arm shafts and sealing plunger.

Parison blank mold 20, formed in two halves, see Figs. 1 and 2, has associated parts as removable funnel 21, finish ring 22, and plunger 23. Finish ring 22 has a basin 24 to provide a protuberance 90 on the finish or bottle neck of the parison. Plunger 23 has a stem 25 to form a blow hole in the protuberance 90. Within the cavity 26 of parison blank mold 20 a gob of molten glass 27 is shown. The parison blank mold 20, in Fig. 3, has the funnel 21 replaced by the baffle 28 and the gob of molten glass 27 has been blown to form the parison 29 after the settle blow has taken place, all in accordance with conventional practice excepting the providing of the blow opening 30 in the protuberance 90. In Fig. 4 the parison 29 has been conveyed to and inverted in the blow mold 31 likewise formed in halves. Herein the parison is shown in dotted line and is blown to form the spherical float 32.

From the blow mold the spherical float 32 is transferred to the dead plate 33 having air holes 34 therein to provide for cooling by air the red hot float 32 when deposited thereon. Oscillating pusher arm 35, actuated by any conventional means, moves the spherical float 32 from the dead plate 33 to the conveyor plate 36. It will be understood that there may be a plurality of such pusher arms 35 and their associated blow molds to provide the desired capacity output. While operating at a relatively slow speed, to provide an output of some three hundred gross per twenty-four hours for the three and a half inch size of the product herein set forth, we find that four such arms incorporated with four associated conventional bottle forming mechanisms are sufficient. Such forming mechanism may be of the rotary or any suitable type, that is, the particular type is immaterial so long as provision is incorporated in the finishing ring and the plunger to provide the blow opening in the herein described protuberance.

All the mechanisms mentioned herein above are standard and conventional parts with the modification as to the finish ring 22 having the protuberance forming basin 24 and the plunger 23 with its stem 25 as explained above. Likewise the means for transferring and inverting the parison are not shown and the means for transferring the spherical glass member 32 from the blow mold 31 to the dead plate 33 is not shown for the reason that all such parts are conventional in glass bottle forming mechanism and, apart from the modification in the finish ring 22 and the stem on the plunger 23, form no part of this application and are set forth herein simply to indicate the definite modifications as explained and the steps leading to the completed seal as will now be described.

The floats 32 are allowed to travel a short distance on conveyor belt 36 to provide an interval for cooling to a degree that permits the glass to be form-retaining against a vacuum which will form within the globe when sealed. Disposed in the longitudinal axis of a conveyor belt 36 are three oxy-acetylene burners preferably of the cutting torch type 37, 38, and 39 and a pneumatic plunger means 40. Such preferred torch not only provides the desired degree of concentrated heat but also operates with a suitable pressure.

This plunger means has a cylinder 41 in which operates a piston 42 carrying plunger head 48. Cylinder 41 is connected by hose 44 to a source of timed pneumatic air pressure as means 88. Plunger head 48 has piston rod 43 with conduit 45 therethrough connected with a source of cooling air under pressure by means of tube 46. This constantly flowing air down conduit 45 escapes through outlets 47. This air maintains the plunger head 48 at suitable temperature.

The face 49 of this plunger head 48 is concave thereby providing the desired form to the top of the finish 98 (that is the bottle neck part) as well as compressing the material of the finish 98 to the desired degree to form the desired thickness of wall. Spring 50 maintains plunger head 48 in retracted position until piston 42 carrying plunger 43 with it is forced down by air pressure.

Along each side of the conveyor belt 36 are eight positioning oscillating arms arranged in pairs 51, 52, 53, 54, 55, 56, 57, and 58. Each of these arms carries a concave spherical contacting member 59. Member 59 may operate to slightly lift the floats 32 from contact with the conveyor belt 36 during the heating period. Arms 35 are timed to move the bodies or floats 32 to conveyor belt 36 so that they will be given a predetermined spacing. The positioning arms 51, 52, 53, 54, 55, 56, 57 and 58 are timed to pull back slightly the bodies 32 to registering position. This accounts for the closeness of the second body of the series to the first body shown beneath the torch or burner 37. Each of these positioning arms are mounted upon shafts 60, 61, 62, 63, 64, 65, 66, and 67. These shafts in turn may be connected to an actuating cylinder 68 and piston means 69 as follows:

Shaft 61 is connected by link means 70 having a slot 71 therein to pin means 72 carried by piston 69 shaft 61 being fixedly mounted with respect to link means 70 so that shaft 61 is revolved in an arc when link means 70 is actuated. A master link 73 is connected by link means 74 to shaft 60 and by link means 75 to shaft 61 and by link means 76 to shaft 62 and by link means 77 to shaft 63 so that when link 70 causes shaft 61 to rotate it actuates master link 73 and through it and their respective link members the other shafts 60, 62, and 63 causing them to rotate. This follows because links 74, 75, 76 and 77 are fixedly mounted with respect to shafts 60, 61, 62, and 63 respectively while said links are pivotally mounted with respect to master link 73.

Similarly shaft 65 is connected by link means 78 having a slot 79 to pin means 72, shaft 65 being fixedly mounted with respect to link means 78, so that shaft 65 is revolved in an arc when link means 78 is actuated. Piston 69 has bearing 80. A master link 81 is connected by link means 82 to shaft 64 and by link means 83 to shaft 65 and by link means 84 to shaft 66 and by link means 85 to shaft 67 so that when shaft 65 is actuated by link 78 the master link 81 is actuated through shaft link 83 thereby actuating through links 82, 84, and 85 the respective shafts 64, 66 and 67. This follows because 82, 83, 84 and 85 are fixedly mounted with respect to shafts 64, 65, 66 and 67 respectively while said links are pivotally mounted with respect to master link 81. Cylinder 68 is connected by tubes 86 and 87 to a rotary timing valve means 88 which in turn is connected by tube 89 to a source of air pressure.

In Fig. 10 is shown another manner of practicing our invention where positioning arms are not employed, that is, how a manually operated oxy-acetylene torch or burner 93 may be applied to the protuberance 90 from different angles to reheat the protuberance 90 of float or body 94. Such a flask may then be moved to transfer tongs 95 having a spring 96 loaded plunger 97.

The mode of operation of the device embodying our invention has already been set forth in large part in connection with the description of the mechanism. It will be seen referring to Fig. 5 that in providing a blow opening in a protuberance that we have provided the necessary extra portion of glass with which to form the seal. This makes it possible to form the sealed spherical fishing float out of a single gob of molten glass. It will be noted with reference to Fig. 5 that in thus providing the protuberance there may be formed a relatively thin wall portion adjacent the blow opening 30 at 91, that is at the base of the protuberance. However, when the protuberance 90 is heated which may be to such a degree as will permit the molten glass to flow into the blow opening 30 and form the seal there results a seal of substantial thickness. This result is further insured by means of applying pressure through the plunger head 48. This has a cooling effect and also operates to press together the material forming the finish so that the degree of thickness of the seal is controlled and the seal positively insured by the pressing in of the molten protuberance material and to some degree the material adjacent to the blow opening. This results in part since the annular walls of the finish which have become somewhat cooled operate as a buttress against which the more fluid material in the blow opening 30 and adjacent to the blow opening is pressed. The drawing into the blow opening 30 of the material of the reheated protuberance 90 is assisted by the partial vacuum developed within the body or float 32 (Fig. 12) and cooperates with the pressure exerted by the plunger 48 in forming the inwardly directed protuberance 99.

This process of forming the seal in a spherical fishing float has proven to be most efficient in providing and insuring positive and strong seals. Obviously, a very small opening will permit leakage under heavy pressure and will require a rejection of the article. The reheated material by being subject to control as to thickness, and by being assured positive disposition within the blow opening, and by being subject to pressure with the annular ring as a buttress, is forced into a most strong and reliable seal, capable of resisting the tremendous pressures obtaining at great depths in the salt water of the ocean or sea.

The article resulting from the above method besides having the strong seal above described in connection with the process of forming the same may have a securing groove 92 by which the float may be secured to a net.

The mechanism results in a positive positioning of the floats while cooling in positive and accurate registration with the oxy-acetylene burners 37, 38, and 39 as well as plunger means 40 as well as plunger head 48. The flame of the oxy-acetylene burners is directed primarily to the protuberance 90. It will be understood that any suitable heating means may be employed such as an electric arc. The rotary timing valve means 88 is a conventional type of compressed air timing mechanism as is commonly used in connection with glass manufacturing machinery.

We claim:

1. The process of making a hollow sealed body comprising forming from a single gob of molten glass a parison having a protuberance with a blow opening therein; blowing said parison into a predetermined shaped body with the finish comprising said protuberance and the blow opening therein; cooling the body until the glass thereof stiffens; reheating the said protuberance until the glass material thereof adjacent the blow opening softens; and applying pressure to the top portion of the finish while the wall of the finish is partially cooled and thus completing the seal, whereby the partially cooled walls of the finish function as a buttress against which the sealing softened glass is pressed to control the seal and the thickness thereof.

2. The process of making a hollow sealed body comprising forming from a single gob of molten glass a parison having a protuberance with a blow opening therein; blowing said parison into a predetermined shaped body with the finish comprising said protuberance and the blow opening therein; cooling the body until the glass thereof stiffens; reheating the said protuberance until the glass material thereof adjacent the blow opening softens; and applying pressure to the top portion of the finish and thus completing the seal.

3. The process of making a hollow sealed body comprising forming from a single gob of molten glass a parison having a protuberance with a blow opening therein; blowing said parison into a spherical body with the finish comprising said protuberance and the blow opening therein; cooling the body until the glass thereof stiffens; reheating the said protuberance until the glass material thereof adjacent the blow opening softens; and applying pressure to the top portion of the finish and thus completing the seal.

4. The process of making a hollow sealed body comprising forming from a single gob of molten glass a parison having a protuberance with a blow opening therein; blowing said parison into a predetermined shaped body with the finish comprising said protuberance and the blow opening therein; cooling the body until the glass thereof stiffens; reheating the said protuberance until the glass material thereof adjacent the blow opening softens; and applying pressure to the top portion of the finish until the filled and sealed opening has a minimum thickness substantially equal to that of the walls of the body.

5. The process of making a hollow sealed body comprising forming from a single gob of molten glass a parison having a protuberance with a blow opening therein; blowing said parison into a predetermined shaped body with the finish comprising said protuberance and the blow opening therein; cooling the body to a temperature within the range of below the melting temperature of the body and substantially above the temperature of the ambient atmosphere, whereby the glass will stiffen and the gas within the body will tend to reduce its pressure and provide a partial vacuum as the ambient atmosphere cools the body; and, while the body is at said temperature in said range, reheating the said protuberance until the glass material thereof softens and enters the blow opening, whereby the partial vacuum causes the softened material to enter and seal the blow opening.

6. The process of making a hollow sealed body comprising forming from a single gob of molten glass a parison having a neck portion, a ring portion extending radially of said neck portion, and a protuberance and a blow opening therein formed centrally of said ring portion; blowing said parison into a predetermined shaped body with the finish comprising said neck portion, said ring portion, and said protuberance and said blow opening therein; cooling the body until the glass thereof stiffens; reheating the said protuberance until the glass material thereof adjacent the blow opening softens; and applying pressure to the top portion of the finish while the ring portion of the finish is partially cooled and thus completing the seal, whereby the partially cooled ring portion of the finish functions as a buttress against which the sealing softened glass is pressed.

GORDON W. ROESSLER.
RAY A. CHILCOTE.

REFERENCES CITED

The following references are of record in the file of this patent:

UNITED STATES PATENTS

| Number | Name | Date |
|---|---|---|
| 1,937,289 | McSwain | Nov. 28, 1933 |
| 2,076,502 | Moscini | Apr. 6, 1937 |
| 1,804,084 | Blake | May 5, 1931 |
| 1,561,808 | Towne | Nov. 17, 1925 |
| 2,031,660 | Loepsinger | Feb. 25, 1936 |
| 1,949,901 | Cosch | Mar. 6, 1934 |
| 910,120 | Edmonds | Jan. 19, 1909 |
| 1,413,169 | Lawton | Apr. 8, 1922 |